3,352,834
CONDENSATION PRODUCTS OF 3-AMINOMETH-YL - 3,5,5 - TRIALKYL - 1 - CYCLOHEXYLAMINE AND ALIPHATIC DICARBOXYLIC ACID AND CYCLIC CARBOXYLIC ACID
Karl Schmitt, Herne, and Josef Disteldorf, Wanne-Eickel, Germany, assignors to Scholven-Chemie Aktiengesellschaft, Gelsenkirchen-Buer, Germany, a corporation of Germany
No Drawing. Filed Nov. 10, 1964, Ser. No. 410,283
Claims priority, application Germany, Nov. 14, 1963, Sch 34,163
12 Claims. (Cl. 260—78)

Aliphatic diamines, such as hexamethylenediamine can, according to the prior art, be condensed with aliphatic dicarboxylic acids, such as adipic acid, to form polyamides of high molecular weight, which have excellent properties as plastics in many fields. Such condensations can also be performed with aliphatic diamines which do not have straight chains, such as alkyl-substituted hexamethylenediamine, for example. The products thereby obtained have the disadvantage primarily that they are too soft at somewhat high temperatures. Use has also been made of aromatic diamines, such as phenylenediamine, for producing condensation products with dibasic acids; in this case, however, products are obtained which are excessively sensitive to oxygen and which discolor very easily.

According to a proposal which does not pertain to the state of the art (German patent application H 44,328 IVd/39c, U.S. Ser. No. 243,182, filed Dec. 3, 1962), polyamines of high transparency and a high softening range can be made by using as the diamine component cyclohexane derivatives of the formula

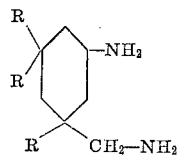

in which R stands for identical or different alkyl groups, for example lower alkyl ($C_1$—$C_4$), especially methyl groups. The polyamide polymers of the invention are non-crystalline polyamides.

It has now been found that polyamides with very valuable properties are obtained if cyclohexane derivatives of the above formula are used as diamine components in the transposition of diamines with dicarboxylic acids performed in the conventional manner, with the addition, if desired, of diamines of the formula $$H_2N—(CH_2)_x—NH_2$$

($x=2$ to 10), which serve to lower the softening point. The proportion of aliphatic diamine can be 5–50 wt. percent preferably 15–30 wt. percent of the total diamine.

The process consists in using as dicarboxylic acids mixtures of acids having an aliphatic and aromatic or hydroaromatic cycloalkane structure. The ratio of the components in the mixture can vary in wide limits; in general it ranges from about 3 to 70 wt. percent to aromatic acid, or hydroaromatic acid in relation to the total dicarboxylic acid; the range from about 5 to 40 wt. percent aromatic or hydroaromatic acid in the total acid is preferred.

The aliphatic dicarboxylic acids that may be used include not only adipic acid, but also its mono, di or tri-alkylated forms such as trimethyladipic acid, for example, and furthermore succinic acid, malonic acid, maleic acid, or the like. The aliphatic dicarboxylic acid, as indicated, can be saturated or unsaturated; it can contain up to about 10 carbon atoms in the straight chain. Examples of the aromatic or hydroaromatic dicarboxylic acids are phthalic acid, isophthalic acid, terephthalic acid, and the corresponding hexahydro acids. Mononuclear cyclic acids are especially contemplated.

The content of aromatic acid in the starting mixture has the effect primarily that the surface hardness of the polyamides produced is substantially improved, as well as their resistance to moisture. In contrast to the conventional polyamides, the products are not crystalline and therefore they are glass clear and transparent. They are rigid, solids excellently suited for applications requiring high mechanical strength along with great transparency, as in the case for example of auto headlights or the like. The final products have a notched impact strength between 4 and 6 cm·kg./cm.$^2$, a ball impression between 1700 and 1800 kg./cm.$^2$ (10 sec.) and a reduced specific viscosity with an $\eta$ red value between 1.3 and 1.7.

The condensation is performed under the customary conditions, i.e., the starting substances can be used either in pure form or in the form of the salts formed by the diamine with the dicarboxylic acids, which are easy to make, in each case, by conventional methods. In general, the components are used in approximately equimolecular amounts. The condensation temperatures range approximately between 150 and 300° C. At the same time, the condensation is preferably performed by first heating the mixture slowly and, after this precondensation stage, applying a vacuum up to about $10^{-1}$ cm. Hg and increasing the temperature gradually further as the viscosity of the melt increases. It is also possible, to work without a vacuum.

Example 1

0.8 mol of adipic acid and 0.2 mol of terephthalic acid are dissolved in 200 ml. of a water-alcohol mixture (50:50 by volume) with heating and stirring, and then 1.01 mol 3 - (aminomethyl) - 3-5,5-trimethyl-1-cyclohexylamine is added drop by drop while the temperature is maintained at 70° C. 200 g. of the salt mixture obtained by cooling and drying are gradually heated to 240° C. in the autoclave at 25 atmospheres above normal pressure together with 20 ml. of water, the added water and the water that forms being gradually removed. The polycondensation is ended after about 15 hours when a temperature of 260° C. is reached. The cooled product is a glass-clear, hard, rigid mass with an $\eta$-red value of about 1.4.

Example 2

Highly purified starting substances consisting of 0.5 mol of adipic acid and 0.4 mol of hexahydroterephthalic acid and 1 mol of 3-(aminomethyl)-3,5,5-trimethyl-1-cyclohexylamine are brought directly to reaction under heat of 240° C. and pressure of 25 atmospheres above normal pressure, while the water of reaction is continually drawn off. At the end of the reaction time of 4 hours, the product is further worked in a vacuum. The condensation polymer obtained after 20 hours of treatment at a final 280° C. is amorphous, transparent and hard, with an $\eta$-red value of about 1.3.

What is claimed is:
1. Poyamide polymer of 3-aminomethyl-3,5,5-trialkyl-1-cyclohexylamine with (1) aliphatic dicarboxylic acid and (2) cycloalkane dicarboxylic acids said polymer being a non-crystalline polyamide.
2. Polyamide polymer according to claim 1, the proportion of the dicarboxylic acids being about 3–70 wt. percent cyclic carboxylic acid.
3. Polyamide polymer according to claim 1, said alkyl groups of the amine being methyl.
4. Polyamide polymer of 3-aminomethyl-3,5,5-trialkyl-1-cyclohexylamine and polymethylene diamine of the formula $H_2N—(CH_2)_x—NH_2$ wherein X is 2–10, with (1) aliphatic dicarboxylic acid and (2) a cyclic car- boxylic acid selected from the group consisting of aromatic and cycloalkane dicarboxylic acids said polymer being a non-crystalline polyamide.

5. Polyamide polymer according to claim 4, the proportion of the dicarboxylic acids being about 3–70 wt. percent cyclic carboxylic acid.

6. Polyamide polymer according to claim 4, the said alkyl groups of the amine being methyl.

7. A rigid, solid, glass-clear, non-crystalline composition consisting essentially of polyamide polymer according to claim 1.

8. A rigid, solid, glass-clear, non-crystalline composition consisting essentially of polyamide polymer according to claim 2.

9. A rigid, solid, glass-clear, non-crystalline composition consisting essentially of polyamide polymer according to claim 3.

10. A rigid, solid, glass-clear, non-crystalline composition consisting essentially of polyamide polymer according to claim 4.

11. A rigid, solid, glass-clear, non-crystalline composition consisting essentially of polyamide polymer according to claim 5.

12. A rigid, solid, glass-clear, non-crystalline composition consisting essentially of polyamide polymer according to claim 6.

References Cited

UNITED STATES PATENTS

| | | | |
|---|---|---|---|
| 2,245,129 | 6/1941 | Greenewalt | 260—78 |
| 3,012,994 | 12/1961 | Bell et al. | 260—78 |
| 3,294,759 | 12/1966 | Gabler | 260—78 |

WILLIAM H. SHORT, *Primary Examiner.*

SAMUEL H. BLECH, *Examiner.*

H. D. ANDERSON, *Assistant Examiner.*